UNITED STATES PATENT OFFICE.

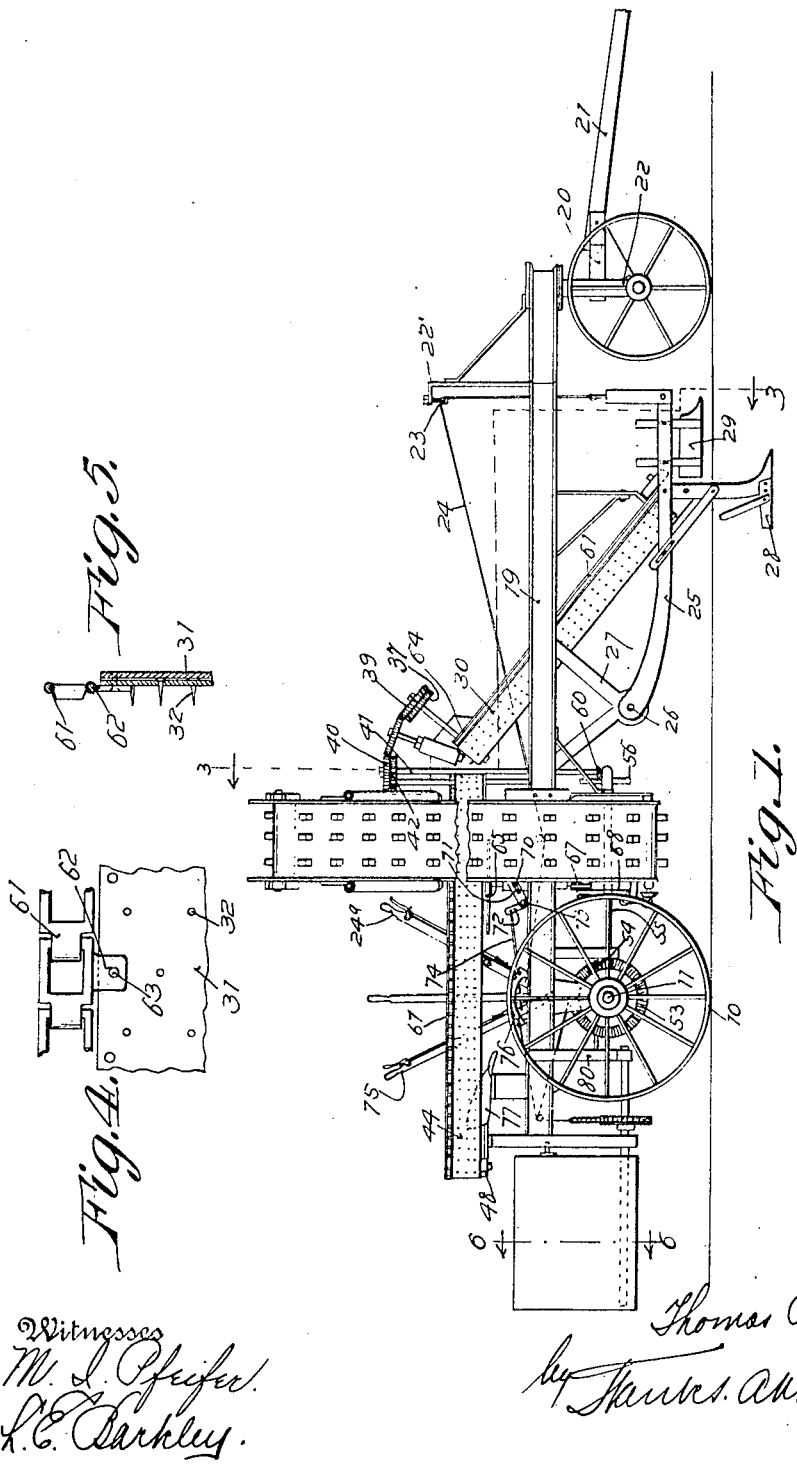

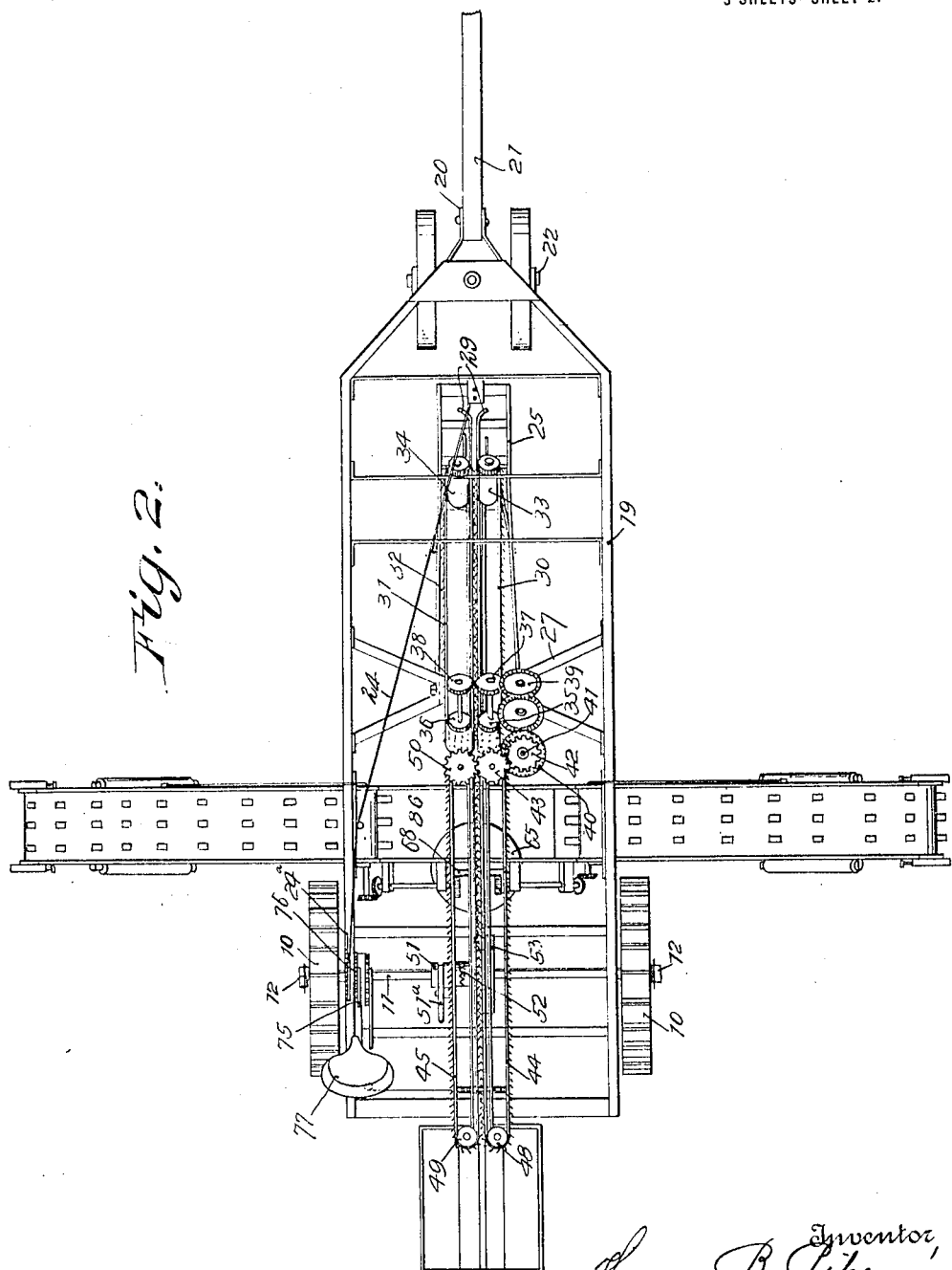

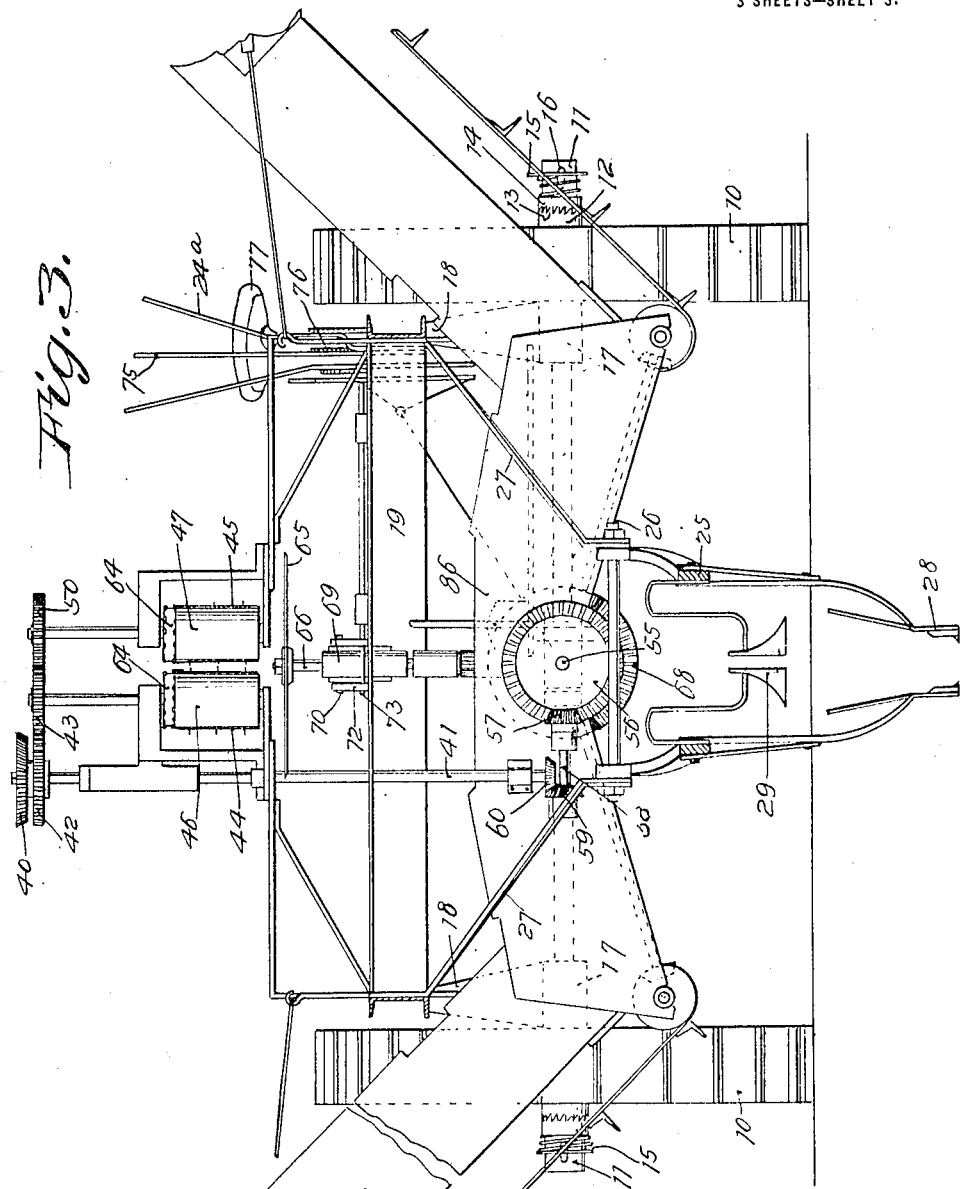

THOMAS B. PIKE, OF PUEBLO, COLORADO.

BEET-HARVESTER.

1,286,092.   Specification of Letters Patent.   Patented Nov. 26, 1918.

Application filed July 27, 1914. Serial No. 853,360.

*To all whom it may concern:*

Be it known that I, THOMAS B. PIKE, a citizen of the United States of America, and resident of Pueblo, in the county of Pueblo and State of Colorado, have invented certain new and useful Improvements in Beet-Harvesters, of which the following is a specification.

This invention relates to harvesters, and particularly to a machine known as a beet harvester, the invention having for its object the provision of novel means for excavating or dislodging beets from the earth, while, at the same time, guiding the beet tops to a carrier so arranged as to retain the beet tops while the carrier is moving, so that the beets are elevated a predetermined distance, the said invention further including novel means for carrying the beets rearwardly and subjecting the same to a knife to sever the tops from the beets, permitting the beets to fall into a chute for delivery to a conveyer by which the said beets are removed laterally and delivered to any proper or convenient receptacle designed to contain them.

A further object of this invention is to provide traction wheels and means associated and coöperating therewith to drive the conveyers and operative parts of the mechanism for accomplishing the results desired.

With the foregoing and other objects in view, the invention consists in the details of construction, and in the arrangement and combination of parts to be hereinafter more fully set forth and claimed.

In describing the invention in detail, reference will be had to the accompanying drawings forming part of this specification, wherein like characters denote corresponding parts in the several views, and in which—

Figure 1 illustrates a view in side elevation of a beet harvester embodying the invention;

Fig. 2 illustrates a top plan view;

Fig. 3 illustrates a sectional view on the line 3—3 of Fig. 1, the conveyer being omitted to better illustrate parts which lie to the rear thereof;

Fig. 4 illustrates an enlarged detail view of a fragment of a conveyer;

Fig. 5 illustrates an end view of the fragment of the conveyer shown in Fig. 4.

In these drawings 10 denotes the traction wheels mounted on a shaft 11. The hubs 12 of the wheels have ratchet teeth 13 which engage the teeth 14 on the collars 15 and each collar 15 is preferably splined on the shaft 11 and is held in engagement with the hub of the wheel by a spring 16, the said spring being yieldable to permit disengagement of the ratchet teeth when the machine is backed or when either of the wheels is moved rearwardly.

The shaft 11 is mounted in the journal bearings 17 of the brackets 18 and the said brackets serve as supports for the frame 19 which is preferably of rectangular construction, as shown in Fig. 2 of the drawing, the said frame terminating in the front end in a converging extension 20 to which a tongue 21 is connected so that any appropriate draft rigging may be utilized for drawing or propelling the machine. The front end of the frame is supported by a truck 22 which may be of any suitable type. Near the front end of the frame is a post 22' from which a pulley 23 depends and a cable or other flexible member 24 is run over the said pulley and is connected to a beam 25, which beam has its rear end mounted on a pivot 26, and the pivot is supported by the brackets 27. By reason of the construction just stated, the beam may be elevated or lowered so that the plow 28, which is carried by the beam, may be allowed to descend a greater or less distance into the earth depending upon the condition of the product to be harvested.

The front view of the device shows that the plow comprises two blades or shears spaced apart so that said blades are on opposite sides of the beet and they operate in conjunction to dislodge the beet from the earth. Furthermore, the beams 25 carry the top guiding members 29 which are spaced apart and so shaped as to guide the tops of the beets to a conveyer, to be presently described.

The forward conveyer to which the beet tops are delivered comprises two conveyer belts or aprons 30 and 31 each of which has spurs or pins such as 32 which stand out from the surfaces of the belts in positions oblique to the direction of travel of the said belts and rearwardly so that when the said spurs engage the beet tops, they serve to carry the same rearwardly and there is little liability of disengagement or dislodgment of the said beet tops from the conveyer, especially so as the spurs of one conveyer belt overlap or extend beyond the ends of the spurs of the other conveyer belt, as shown in Fig. 2.

As a means for supporting the conveyer belts, appropriate rollers 33 and 34 are journaled in brackets at points slightly above the excavator and the conveyer belts run over such rollers. Likewise, intermediate the length of the frame, other rollers 35 and 36 are supported for engaging the said belts and the last mentioned rollers are rotated by the intermeshing gear wheels 37 and 38, the former of said gear wheels being positively driven through the medium of the gear wheel 39. As a means for communicating power to the gear wheel 39, it is in mesh with a wheel 40 on a shaft 41, which shaft stands vertically and is supported in any appropriate way with relation to the frame. The driven shaft 41, furthermore carries a gear wheel 42 meshing with a gear wheel 43 by which the rear conveyer is driven, the said rear conveyer having conveyer belts 44 and 45 similar to the conveyer belts 30 and 31, the said conveyer belts 44 and 45 operating over rollers 46 and 47, about the center of the frame and the rollers 48 and 49 at the rear of the frame. The conveyer belts 44 and 45 extend approximately horizontally and are driven in unison by reason of the fact that the gear wheel 43 meshes with a gear wheel 50 on shafts which turn the rollers 46 and 47, thus the front and rear conveyers are driven from the same shaft which derives its power in a manner to be presently explained.

The shaft 11 has a clutch 51, one member 52 of which is connected to and rotates a gear wheel 53 which gear wheel in turn is in mesh with a pinion 54 on the shaft 55, the said shaft being journaled in proper bearings (not shown) and having at its forward end a beveled gear wheel 56 meshing with a pinion 57 on the shaft 58, the said shaft 58 also having a beveled gear wheel 59 meshing with the gear wheel 60 on the shaft 41 so that by the train of gearing just described, the motion of the traction wheels is communicated to the conveyers since it has been described that the shaft 41 is effective to operate both of the conveyers.

As a means for positively driving the conveyers which run over the rollers, the upper marginal edges of the said conveyers are connected to sprocket chains 61, certain links of which chains have ears 62 connected to the conveyer belts by fastenings 63 and the said sprocket chains 61 mesh with sprocket wheels such as 64 which are on the shafts of the respective drums and rotate therewith. By reason of this arrangement the conveyer belts cannot sag or become dislodged or disengaged from the rollers and the arrangement also insures a positive operation thereof.

Intermediate the length of the frame and under the horizontally disposed conveyer is a rotating knife 65 mounted on a vertically disposed shaft 66, said shaft being journaled in bearings and having at its lower end a gear wheel 67 which is driven by a gear wheel 68 on the shaft 55. The shaft 66 rotates in a sleeve 69 and is moved thereby in a vertical direction to regulate the position of the knife with relation to the conveyer so that the beet tops may be cut at certain positions with relation to the beets. As a means for adjusting the sleeve, the said sleeve has transversely disposed pins 70 projecting through slots 71 of the bell crank lever 72, said bell crank lever being mounted on a pivot 73 and being operated by a connection 74 leading to the lever or handle 75, said lever being here shown as operating in conjunction with a toothed segment 76 by which the said handle may be held at different positions of adjustment by known means. The operator occupying the seat 77 may, therefore, manipulate the lever and so change the position of the knife as to cause it to cut the tops of the beets without marring or damaging the beets themselves or allowing too great a length of the tops to remain on the beets.

The clutch 51 may be drawn into and out of action by the lever 51ª, but the construction of the clutch is immaterial, as a clutch of any known construction may be employed at this point.

The flexible connection 24 which is designed for the purpose of operating the beam 25 extends rearwardly and is connected to a lever 24ª within reach of the operator occupying the seat 77, thereby making it possible for the operator to manipulate the several parts of the machine for increasing its efficiency, according to known conditions.

It is the purpose of the inventor to provide means for collecting the beets which have been severed from the tops and to that end a collecting hopper or receptacle 86 is situated under the forward edge of the knife so that beets which have been severed from their tops may fall into the collector 86.

In the operation of the beet harvester, it will be apparent that the excavator or plow may be caused to dislodge the beets from the earth while at the same time the tops of said beets will be guided toward the inclined conveyer and the teeth or spurs of the conveyer belts will penetrate the beet tops and carry them to the horizontally disposed conveyer and the beet tops will be carried rearwardly and deposited in the hopper. During the travel of the conveyers carrying the beets, the knife which is in the path of travel of the beets may be lowered or elevated to effect a severance of the tops just above the beets so that the beets will fall into the receptacle and be conveyed laterally in the manner stated.

The means for manipulating the plow beam and knife have been described and need not be here reviewed. It is also believed that the manner of transmitting power from the traction wheels to the knife and to the conveyers has been sufficiently described to enable one skilled in the art to practice the invention by reference to this specification, and the detailed operation of the several parts which follows a description of their construction and arrangement is believed to be sufficient without further résumé.

I claim

In a beet harvester, the combination of a frame, wheels for supporting the frame, means adjacent the forward end of the frame for dislodging the beets, means for guiding the beets, inclined conveyer belts having their forward ends in close proximity to the dislodging means, parallel belts operating in a horizontal plane adapted to receive the beets as they pass from the inclined conveyer, means for operating the belt members, a rotary knife mounted intermediate the length of the frame and under the horizontally disposed conveyer, and means for adjusting the knife whereby the beets will be properly topped.

In testimony whereof, I affix my signature in the presence of two witnesses.

THOMAS B. PIKE.

Witnesses:
JNO. W. LOCKIN,
GRACE PIKE.

Copies of this patent may be obtained for five cents each, by addressing the "Commissioner of Patents, Washington, D. C."